United States Patent
Prokopenko et al.

(10) Patent No.: US 10,440,640 B2
(45) Date of Patent: Oct. 8, 2019

(54) BASE STATION CONDITIONS RESOURCE ADAPTATION

(71) Applicant: Rawllin International Inc., Tortola (VG)

(72) Inventors: Anton Prokopenko, Saint-Petersburg (RU); Maksim Shakhmetov, Saint-Petersburg (RU); Denis Kulikov, Saint-Petersburg (RU)

(73) Assignee: VIGO SOFTWARE LTD, Nicosia (CY)

( * ) Notice: Subject to any disclaimer, the term of this patent is extended or adjusted under 35 U.S.C. 154(b) by 715 days.

(21) Appl. No.: 14/054,707

(22) Filed: Oct. 15, 2013

(65) Prior Publication Data
US 2015/0103754 A1    Apr. 16, 2015

(51) Int. Cl.
| | |
|---|---|
| *H04W 48/00* | (2009.01) |
| *H04W 24/08* | (2009.01) |
| *H04W 72/04* | (2009.01) |
| *H04W 74/00* | (2009.01) |

(52) U.S. Cl.
CPC .......... *H04W 48/17* (2013.01); *H04W 24/08* (2013.01); *H04W 72/0486* (2013.01); *H04W 74/00* (2013.01)

(58) Field of Classification Search
None
See application file for complete search history.

(56) References Cited

U.S. PATENT DOCUMENTS

| | | | |
|---|---|---|---|
| 6,865,609 B1* | 3/2005 | Gubbi | H04L 29/06 370/349 |
| 10,003,830 B1* | 6/2018 | Morgos | H04L 65/4084 |
| 2007/0008967 A1* | 1/2007 | Bressler | H04L 12/189 370/390 |
| 2009/0180430 A1* | 7/2009 | Fadell | H04L 47/10 370/329 |
| 2010/0002724 A1* | 1/2010 | Turlington | H04L 12/4633 370/468 |
| 2010/0157841 A1* | 6/2010 | Puthenpura | H04L 41/0896 370/253 |
| 2012/0117225 A1* | 5/2012 | Kordasiewicz | H04L 65/1083 709/224 |
| 2012/0297430 A1* | 11/2012 | Morgos | H04L 65/4084 725/88 |
| 2014/0032762 A1* | 1/2014 | Harvey | H04N 21/25891 709/226 |

(Continued)

*Primary Examiner* — Younes Naji
(74) *Attorney, Agent, or Firm* — Amin, Turocy & Watson, LLP

(57) ABSTRACT

Monitoring client traffic at frequencies suitable to infer playback information of applications executing at the client device is described herein. By way of example, network traffic transmitted to a client application can be analyzed to determine an amount of traffic consumed by the client. Based on the amount of traffic and optionally network conditions observed by the client, a suitable resource level can be determined for conveying the traffic to the client. Adjustments to allocated resources can be made, where requested, to improve consumption rates of allocated resources. The resource level can be determined at a frequency suitable to identify changes in playback state of the client application, to provide changes in allocated resource that closely respond to changes in traffic demand.

29 Claims, 10 Drawing Sheets

(56) References Cited

U.S. PATENT DOCUMENTS

2014/0096169 A1* 4/2014 Dodson ................ H04N 21/262
　　　　　　　　　　　　　　　　　　　　　　725/97
2014/0335877 A1* 11/2014 Roberts ................ H04W 28/16
　　　　　　　　　　　　　　　　　　　　　　455/452.1

* cited by examiner

BASE STATION CONDITIONS RESOURCE ADAPTATION

TECHNICAL FIELD

The subject disclosure refers generally to directed resource adaptation for client-network communication, e.g., to adaptation of network resources in response to base station traffic conditions.

BACKGROUND

Content and service providers generally employ multi-access servers to handle client communication or content requests, provide encryption or other security, and to track usage for billing content and services consumed by client devices. For high data applications and related content archiving, large capacity data storage devices are often utilized and configured to store this content, and in conjunction with the multi-access servers, permit access to subsets of the stored content. Common modern examples of online content or services include multimedia content such as movies, episode-based television content such as sitcoms, news programs, and other audio/video content, as well as audio content, and even real time interactive audio/video content, single-player or multiplayer games, as well as communication services, blogs, online forums, e-mail, text messaging, multimedia messaging, and so on.

In the past, network communications largely involved employing a client device for accessing information on a server (e.g., an FTP server), accessing an html page on the World Wide Web (web page) to view content posted to the web page, or the like. The information was downloaded and displayed onto a display of the client device for consumption by a user. Though network communications are known to have latency, data loss and other variable conditions that degrade quality or speed of traffic, redundancy is built into such communications to ensure that a requested resource will eventually be delivered to the client device. In a paradigm of downloaded data displayed on a device in which the acquiring an accurate copy of the data is not in doubt, the main performance factor affecting user satisfaction is time taken to download and display data, after sending a request. However, in a paradigm of real-time communications or streaming media, additional conditions affect consumer satisfaction.

In the case of electronic voice communications, whether analog or digital, sufficient signal clarity, noise reduction and bandwidth are involved in providing a clear, uninterrupted and continuous audio representation of a speaker's voice to a listener. Video conferencing presents a similar challenge, with higher resource consumption. To convey audio and video together synchronously, and with good clarity, sufficient network resources are involved to encode and transmit both audio and video data at a sufficient speed among network devices. The number of resources to transmit audio and video over a network is generally much more than for audio alone, particularly for higher resolutions of video (e.g., 720p resolution, 1080p resolution). Similarly, streaming media content, including streaming audio, streaming video, or streaming audio/video (e.g., an online video or cinematic movie), can involve relatively high bandwidth or data rates to deliver content to a client with sufficient continuity to provide an enjoyable playback experience. In the case of downloading a webpage, insufficient network resources to yield a fast data transfer can be merely a slight inconvenience, but where continuity of streaming media is involved, insufficient resources to provide audio/video continuity can significantly degrade user satisfaction with network-sourced content.

As illustrated with the data download paradigm to the streaming media content or real-time communication paradigm, changes in network communication technology can lead to new challenges in meeting customer expectations. Network communication technology is generally adapting and changing to meet these new expectations. These and other evolutions of communication technology drive much of modern research and development to keep up with consumer demand.

SUMMARY

The following description and the annexed drawings set forth in detail certain illustrative aspects of the disclosed subject matter. These aspects are indicative, however, of but a few of the various ways, or embodiments, in which the principles of the disclosed subject matter may be implemented. The disclosed subject matter is intended to include all such embodiments and their equivalents. Other advantages and distinctive features of the disclosed subject matter will become apparent from the following detailed description of the various embodiments when considered in conjunction with the drawings.

Aspects of the subject disclosure provide for observation of client device traffic to infer playback information of applications executing at the client device. In some aspects, network resources can be provisioned to the client device at least in part as a function of the playback information. In other aspects, a playback state of an application can be inferred from client device traffic or related information, or can be specified by the client device. In one or more aspects, the playback information can have a temporal resolution suitable to reflect a playback state of the application. For instance, client traffic can be analyzed at a rate of once per several seconds or faster, thereby facilitating inference of play, pause, record, forward, rewind, or other settings related to demand for network resources, or the like.

In aspects of the subject disclosure, provided is a system. The system can comprise a first communication device configured to send a signal to or receive a signal from a network access device. For example, the network access device facilitates client access to a communication network for a client device. In addition, the system can comprise an analysis component configured to acquire current application-specific network traffic information pertaining to the client device and to infer a state of an application operating at the client device from the application-specific traffic information. Further to the above, the system can comprise a second communication interface configured to transmit a report signal to a server device of an online service network.

According to one or more aspects, disclosed is a method. The method can comprise receiving a time varying indication of network traffic, parsed as a function of content type, particular to a client device. Furthermore, the method can comprise analyzing the network traffic particular to the client device for time-related patterns in consumption of the network traffic having the content type. In additional aspects of the subject disclosure, the method can comprise inferring a current playback state of an application operating on a client device at least in part from the time-related patterns.

In one or more other aspects of the subject disclosure, provided is a computer readable storage medium comprising computer-executable instructions that, in response to execution, cause a system comprising a processor to perform operations. The operations can comprise parsing traffic transmitted to a client device as a function of a set of predetermined traffic categories and identifying parsed traffic having a traffic category of the set of predetermined traffic categories determined to be provided for an application on the client device. Further, the operations can comprise monitoring the parsed traffic at a rate configured to facilitate an inference of a current playback state and changes in the current playback state of the application on the client device.

In at least one additional aspect, the subject disclosure provides a system. The system can comprise means for analyzing time varying network traffic, parsed as a function of content type, particular to a client device. Further, the system can comprise means for identifying changes in consumption of the network traffic having the content type and means for inferring a current playback state of an application operating on a client device at least in part from the identified changes in consumption. According to other aspects, the system can comprise means for facilitating an increase in or a decrease of network access point resources in response to current network access point resources failing to match at least the current playback state of the application.

The following description and the annexed drawings set forth in detail certain illustrative aspects of the disclosed subject matter. These aspects are indicative, however, of but a few of the various ways in which the principles of the disclosed subject matter can be employed and the disclosed subject matter is intended to include all such aspects and their equivalents. Other advantages and novel features of the disclosed subject matter will become apparent from the following detailed description when considered in conjunction with the drawings.

DETAILED DESCRIPTION

Figure 1:
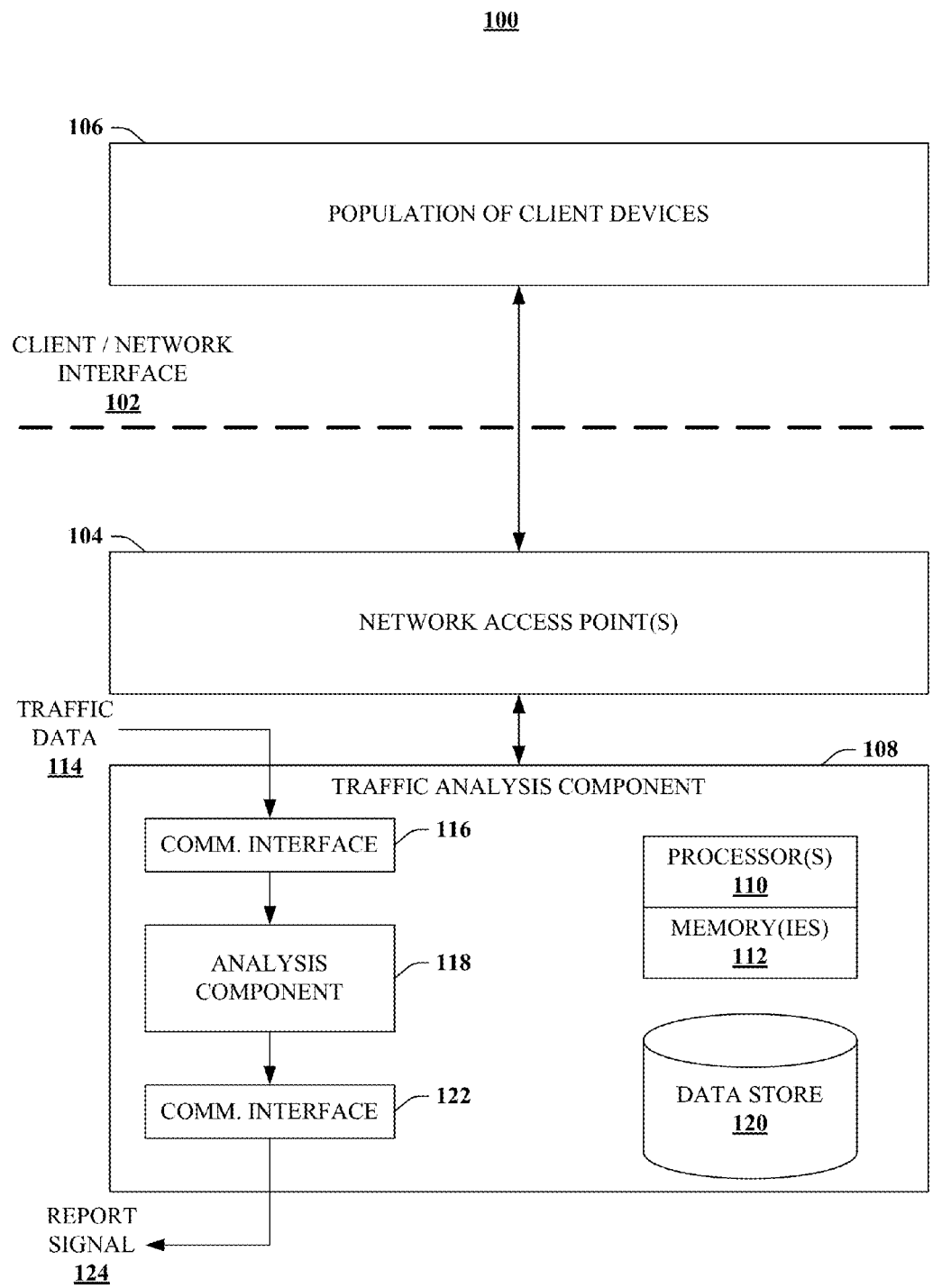
FIG. 1 depicts a block diagram of an example system configured to manage client device network resources according to one or more disclosed aspects.

The disclosed subject matter is described with reference to the drawings, wherein like reference numerals are used to refer to like elements throughout the description. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram or schematic form in order to facilitate describing various aspects disclosed herein.

Reference throughout this specification to "one embodiment," "an embodiment," "a disclosed aspect," or "an aspect" means that a feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the features, structures, or characteristics may be combined in any suitable manner in various disclosed embodiments.

As utilized herein, terms "component," "system," "module", "interface," "user interface", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

Since the advent of network-based computer services, challenges involved in delivering network services to a dynamic population of client devices have been a driving motive of new technology. For instance, each network access point whether wired or wireless has a finite amount of network resources to allocate to client devices. Ideally, as many client devices as attempt to access a network will be served by a network access point. However, because it is possible to have more client device demand than network resources to serve the demand, a conflict can exist with this goal of provisioning service to every client device attempting access.

In addition to the foregoing, new online content paradigms involve some sort of elevated QoS, elevated performance, or the like, to facilitate adequate consumer satisfaction. For instance, high quality voice over Internet protocol (VoIP) can involve elevated QoS related to continuity of audio communications, low jitter, noise reduction or signal clarity, to achieve sufficient consumer satisfaction. Likewise, streaming media services such as streaming movies or video conferencing can involve elevated performance in terms of sufficient bandwidth or data rates to convey high resolution video and audio, audio/video continuity to meet playback or participant expectations, and the like. Thus, as services become more complex, the technology for delivery of these services tends to become more demanding.

In many instances, the goal of serving all client devices will conflict with the goal of meeting high demand services. Some attempts to address this conflict exist or have been theorized. For example, best effort traffic is a mechanism for giving service to as many subscribers as possible, with the resources available. However, the best effort traffic model can result in loss of service when available resources are insufficient to support the service. The guaranteed bit rate (GBR) model is intended in part to address this problem with the best effort traffic model. The GBR model allocates an amount of resources sufficient to provide a predetermined bit rate at the client device. This allocation is provided to subscribers in response to initiation of a application on a client device. However, where poor network conditions exist between a network access point and the client device, far greater access point resources can be required to deliver the predetermined bit rate to the client. This can cause several problems, ranging from dropped service for existing client devices, network inaccessibility for new client devices, or loss of the GBR service.

In part to address various problems with various network communication models and other aspects of network communications, the subject disclosure provides various embodiments for network resource provisioning tailored to current demand of client devices. Client device demand can be determined explicitly or implicitly, depending on availability of client information. For instance, where a client is configured to convey traffic demand of applications operating on the client, client demand can be obtained explicitly from the client. As another example, client device traffic can be monitored to infer a current playback state of one or more applications operating on the client.

In some disclosed aspects, one or more streams of traffic can be identified by analyzing and identifying type(s) of content delivered to the client (e.g., text traffic, webpage traffic, audio traffic, video traffic, audio/video traffic, . . . ), identifying different sources of packets (e.g., different servers), or the like, or a suitable combination thereof. Respective streams of traffic can be assumed to be delivered in conjunction with a application or service (e.g., text communication service, web browsing service, streaming audio service, streaming video service, streaming audio/video service, real-time voice or voice and video communication service, etc.). Moreover, playback state of an application can be inferred from a bit rate of a stream(s) of traffic. A current bit rate, playback state, etc., can be stored at a network access point (e.g., base station, . . . ). In aspects, the traffic consumption metric can be repeated at a rate comparable to a user usage rate for an application (e.g., a frequency with which a user might interact with the application), including a rate with which a user can play, pause, stop, forward, reverse, etc., the application. Thus, in at least some aspects, traffic consumption determinations can be taken every several seconds, or less to provide sufficient traffic resolution to determine a change in playback state shortly after a user initiates the change.

Utilizing a current determined bit rate of a stream(s) of traffic, or from the playback state, appropriate network resources can be allocated to the client device. In this way, allocation of network resources can be closely tailored to current demand of network client devices. This can mitigate or avoid wasted resource allocation, in which network resources are reserved for a device that is not currently using those resources.

In some aspects, a network service can access client consumption information for adaptive service provisioning. For instance, an external content service (e.g., a third party content provider) can be configured with an application programming interface, or other communication interface, to facilitate requesting client information from an access point of a network. The access point can then periodically generate or collect resource consumption information for a client device, a group of client devices within a cell, or a group of cells, and store the consumption information as a function of time, client, cell, group of cells, etc. Subsets of the information can be provided to the network service in response to the request. In at least one aspect, the network service can then be configured to modify a service—generally, for specific network access points, or for specific client devices—to accommodate available network services or network communication conditions.

Referring now to the figures, FIG. 1 illustrates a block diagram of an example system 100 that facilitates determination of current network resource demand for clients of a communication network. System 100 can include one or more network access points 104 facilitating electronic communication with a population of client devices 106. The electronic communication can take place over a client/network interface 102. It should be appreciated that in some disclosed aspects, client/network interface 102 can be a wireless communication interface (e.g., radio access network, microwave access network, satellite communication network, etc.), a wired communication interface (e.g., cable network, optical fiber network, digital subscriber line network, switched-circuit telephone network, etc.), or a suitable combination thereof (e.g., a WiFi local area network served by a cable network Internet service provider, and so forth). Further, network access point(s) 104 and population of client devices 106 are access points and devices suitable to a type of client/network interface 102, though any suitable type of client/network interface 102 can be included as part of system 100. For instance, in the mobile communication context, network access point(s) 104 can be a base station, base transceiver station, or the like, whereas population of client devices 106 can include cellular phones, smart phones, computing devices with wireless communication, media playback or recording devices with wireless communication, and so on. System 100 is not limited to a communication interface, or an access point/client equipment.

Further to the above, system 100 can comprise a traffic analysis component 108 associated with network access point(s) 104. Traffic analysis component 108 is configured to determine current resource consumption information pertaining to one or more of population of client devices 106. The determination of resource consumption information can be quantitative or qualitative information acquired explicitly (e.g., from a signal sent by the one or more of population of client devices 106, or by network access point(s) 104), or implicitly (e.g., derived from historic statistical information, derived from current network traffic information, derived from application-specific traffic information, or the like, or a suitable combination thereof). Once determined, the resource consumption information can be employed in conjunction with adaptive resource provisioning by network access point(s) 104. In at least some aspects, the resource consumption information can be acquired at relatively high frequency, for instance on an order of time comparable with user usage of an application operating on one or more of population of client devices 106. In this manner, application-level information can be derived for the client devices, facilitating allocation of network resources at least in part as a function of application-level activity, such as initiation of a application, request for/consumption of network content by the application, playback, pause, stop, forward or reverse, etc., status of the application, and so on. This can facilitate well-tailored resource allocation to mitigate non-use of allocated resources and high utilization of available resources by population of client devices 106.

In some aspects disclosed herein, traffic analysis component 108 can be physically integrated with or within a network access point 104. In other aspects, however, traffic analysis component 108 can be an external entity from access point(s) 104, communicating with network access point(s) 104 via a network, via a remote communication interface, via a direct wired or wireless link, and so forth. It should be appreciated that traffic analysis component 108 can be configured to operate in conjunction with a single network access point 104 in some embodiments, whereas in others traffic analysis component 108 can be configured to operate in conjunction with multiple network access points 104.

Traffic analysis component 108 can comprise a processor(s) 110 for executing instructions associated with functions of traffic analysis component 108. These instructions can be stored in a memory(ies) 112. Although a single processor 110 and memory 112 are depicted by FIG. 1, it should be appreciated that multiple processors 110 (e.g., a multi-core processor, multiple processor chips interfaced or interlaced by suitable communication structure, timing or controls—not depicted—multiple processors with shared processing linked and operated over a network, or the like, or a suitable combination thereof) or multiple memories 112 (e.g., storage drives, memory cards, databases, and so on) can be employed, as suitable.

Furthermore, traffic analysis component 108 can comprise a first communication interface 116. First communication interface 114 can be configured to send a signal or receive a signal from a network access device, such as network access point(s) 104. Utilizing first communication interface 116, then, traffic analysis component 108 can be configured to communicate with network access point(s) 104, and by proxy with one or more of population of client devices 106.

According to various aspects of the subject disclosure, first communication interface 116 can conduct communication that includes receiving traffic-related information 114 pertaining to network traffic consumed by, or network resources allocated to, one of population of client devices 106. This traffic-related information 114 can be originated at the client device (e.g., in the event the client device is configured to measure or otherwise acquire the traffic-related information), at network access point(s) 104, or at an external entity. The external entity can, for instance, be an entity configured to access at least a portion of traffic conveyed by network access point(s) 104 to the client device, obtain network resource allocation to the client device, or obtain network communication conditions affecting the client device, or the like, or a suitable combination thereof (e.g., see traffic analyzer 210 of FIG. 2, infra).

Traffic analysis component 108 can further comprise an analysis component 118. Analysis component 118 can be configured to receive the traffic-related information 114 from first communication interface 116. Analysis component 118 can then parse the traffic-related information 114, identifying network resources allocated to the client device, if present, any changes in allocation of the network resources, and so on. Network resource information derived from traffic-related information 114 can be stored in a data store 120.

Additionally, analysis component 118 can parse the traffic-related information 114 for data packets delivered to the client device. The data packets can be sub-parsed as a function of origination source, type of service of the origination, type of payload data, service associated with payload data, or the like. By parsing data packets in such a manner, analysis component 118 can attempt to identify subsets of traffic-related information 114 associated with an application operating on a client device. As an example, analysis component 118 can attempt to identify a stream of audio data transmitted to the client device, a stream of video data, a stream of audio/video data, or other suitable media content data. As another example, analysis component 118 can attempt to identify data having a traffic signature typical of web-browsing traffic (e.g., a-periodic high data rate traffic, or other suitable model of web-browsing traffic), and associate such traffic with a web browsing application. As yet another example, analysis component 118 can attempt to identify a source of traffic and determine whether information pertaining to the source can be associated with an application(s). For instance, a server that can be identified as a web browsing server can be associated with the web browsing application, and data packets sent to the client device from the web browsing server can also be associated with the web browsing application. As another example, traffic originating at an online video server (e.g., an online streaming movie server) can be associated with an audio/video application, and so on. At a given point in time, application-related analysis results that can be inferred from the traffic-related information 114 can be stored in data store 120 as well.

Further to the above, application-related analysis results or network resource information can be output as a report signal 124 via a second communication interface 122. In one disclosed aspect, report signal 124 can be forwarded to network access point(s) 104 to facilitate allocation of network resources suitable to current demand of the client device (in this aspect, second communication interface 122 could be the same as first communication interface 116). For instance, where application-related analysis results indicate the client device is operating a streaming audio/video application, network access point(s) 104 can allocate network resources having quality or bit rates suitable for such an application. As another example, where application-related analysis results indicate the streaming audio/video application is currently paused, or stopped (e.g., inferred from a significant drop in data packets determined to be associated with the audio/video application being transmitted to the client device), a lower bandwidth can be allocated to the client device, freeing up additional bandwidth for other ones of population of client devices 106 having high contemporaneous bandwidth needs. Similar rules for governing allocation of network resources based on real-time traffic-related information 114 or application-related analysis results can be implemented as well, as known in the art or made known to one of ordinary skill in the art by way of the context provided herein.

In another disclosed aspects, report signal 124 can be forwarded to a service network. The service network can be, for instance, a provider of online audio/video content; although the service network could alternatively or additionally be any other suitable network content provider. In this context, application-level analysis results or current network resource allocations stored in data store 120 can be included within report signal 124, to facilitate tailoring content to current conditions of the client device. Thus, for instance, where a wireless client is observing significant radio interference, the service network can modify a requested service or in-progress service to lower resource requirements associated with delivering the service to the client device. This, in turn, can help to mitigate or avoid over-allocation of network access point(s) 104 resources resulting from providing suitable QoS or bit rates to facilitate delivering the service, in the presence of the significant radio interference.

Figure 2:
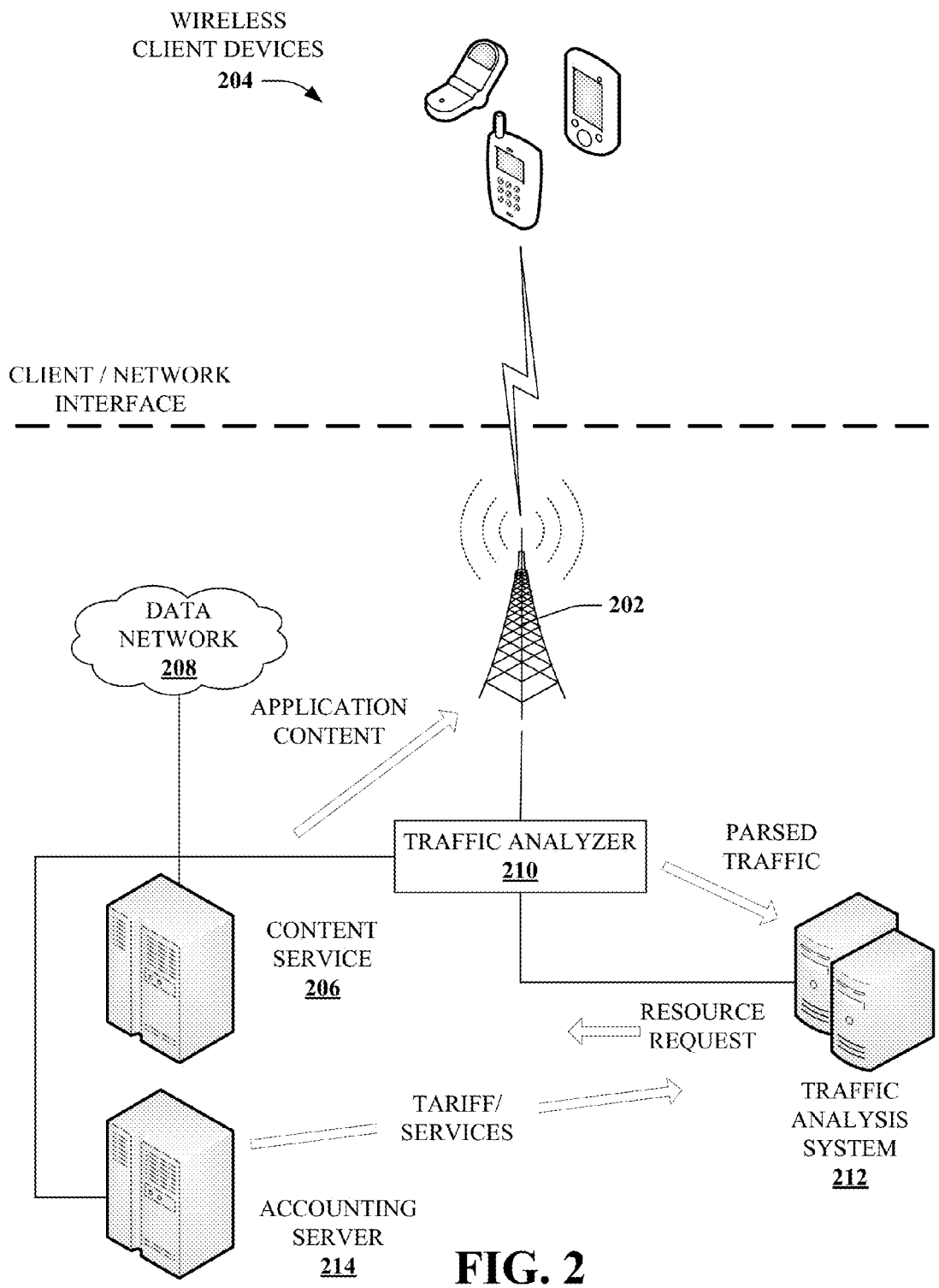
FIG. 2 illustrates a block diagram of a sample system to receive and analyze client device traffic to infer a state of the client device, in an aspect(s).

FIG. 2 depicts a block diagram of a sample wireless communication system 200 according to one or more aspects of the subject disclosure. Wireless communication system 200 can be configured to facilitate allocation of network resources based at least in part on playback state of a client application. In at least one aspect of the subject disclosure, wireless communication system 200 can be a wireless analogue of system 100 of FIG. 1, supra, having a subset of the features of system 100, and optionally additional features discussed below. However, the subject disclosure is not limited to this aspect(s), and wireless communication system 200 can have a range of similarities or differences from system 100 in other suitable aspects.

Wireless communication system 200 can comprise a network base station 202 and a set of mobile client devices 204 configured to communicate respectively over a client/network interface. Network base station 202 can comprise a wireless transceiver facilitating access to a data or communication network for mobile client devices 204. Examples of network base station 202 can include a cellular network or mobile network base station (e.g. eNodeB, base transceiver station, . . . ), a wireless access point for a wireless interoperability for microwave access (WiMAX) network, a WiFi router for a local area network, a wireless access point for a wide area network, or the like, or a suitable combination thereof. Wireless client devices 204 can include a computing device configured to communicate wirelessly with network base station 202. Examples of wireless client devices 204 can include a cellular phone, a smart phone, a personal digital assistant, a laptop computer, a tablet computer or other handheld computing device, a desktop computer, a wireless-enabled television set top box, a wireless-enabled television, or the like. By establishing a connection with network base station 202, wireless client devices 204 can gain access to a network associated with network base station 202, as well as other networks connected thereto (e.g., the Internet), networks connected to those networks (e.g., a service provider network connected to the Internet), and so on.

Wireless client devices 204 can gain access to data, content, services, etc., located at a data network 208 or content service 206 and available by way of network base station 202. Thus, for instance, once communication with network base station 202 is established, an application operating on a wireless client device 204 could seek to contact, register with, sign onto, etc., content service 206. Based on content requests and agreements between content service 206 and the application (e.g., subscriber agreement, service agreement, . . . ), application content is transmitted by content service 206 to the wireless client device 206, by way of network base station 202 and any other intervening networks (e.g., data network 208). Content agreements with content service 206 can be established utilizing an application at a client device 204 that is associated with content service 206. For instance, the application can be activated to communicate with content service 206, and a subscriber agreement, service agreement, or the like, can be established between content service 206 and the application operating on client device 204. Terms of the agreement(s) between content service 206 and the application and related information for facilitating identification of a requesting entity, access to content and delivery of content, can be stored in accounting server 214. Terms of the agreement and related information can include, for instance, identification information for the application, client device(s) 204, or user thereof (e.g., for authenticating identity of an entity requesting service under the agreement(s)), resource allocations associated with acquiring content—including amount of resources, quality of resources, resource guarantee(s), or priority of resources, or the like—content or services accessible through the agreement, or tariff/cost/billing information pertaining to content or resources consumed, or the like, or a suitable combination thereof. Thus, a request for access to a content or service can be referred to accounting server 214, and if allowed, tariff, resource, billing and like information can be acquired from accounting server 214 to govern delivery of the content or service.

Content or services requested by an application operating on one of wireless client devices 204 can be delivered as part of application content/traffic to the application and the wireless client device 204. A traffic analyzer 210 can be deployed to measure the application content transmitted to the wireless client device 204 and parse the application content as a function of time, device, application, or other factors. Parsed application content can be provided to a traffic analysis system 212 configured to determine information pertaining to a state of the application. Such a determination can be on a time scale similar to a rate of playback activity of the application. The rate of playback activity can be inferred from changes in the application content, can be explicitly provided to traffic analysis system 212 by wireless client devices 204, can be predetermined and stored at traffic analysis system 212, or the like, or a suitable combination thereof.

Traffic analysis system 212 can be configured to monitor the application content delivered to the application of wireless client device 204. For example, traffic analysis system 212 can identify a start(s) of content transmission, end(s) of content transmission, and changes in content transmission over time. Based on the start, end and changes in content transmission, traffic analysis system 212 can calculate a time-varying amount of network resources involved in delivering the application content, optionally at a defined resource level, QoS level, user satisfaction level, or the like (e.g., guaranteed bit rate, guaranteed bandwidth, . . . ). Moreover, the time-varying amount of network resources can be re-calculated at a rate suitable to adapt to user changes in content consumption (e.g., playback, . . . ) of the application. Thus, where a user stops playback of an online video, traffic analysis system 212 can identify an associated reduction in application content transmitted to the application from content service 206, as determined by traffic analyzer 210 in parsed traffic sent to traffic analysis system 212. Traffic analysis system 212 can then calculate a new level of resources suited to the decreased application content, and send a resource request to network base station 202 indicating the new level of resources.

Network base station 202 can be configured to adapt resource allocation to wireless client devices 204 based on current content consumption rates of wireless client devices 204. In some aspects, the adapted resource allocation can include different resource allocation schemes. For instance, guaranteed bit rate resources can be assigned in response to high content activity. When low activity is detected, best effort resources can be allocated instead of guaranteed bit rate resources. In another example, guaranteed bit rate resources can be allocated up to a set bit rate (optionally based at least in part on current content demand, a subscription agreement, or like factors), with demand exceeding the set bit rate satisfied by best effort resources. Moreover, the set bit rate can be adjusted real-time based on changes in application playback activity determined by traffic analysis system 212. As described herein, these changes in application playback activity can be in response to changes in application content transmitted to a wireless client device 204, in response to explicit report of a current playback state from wireless client device or the application, or a combination thereof. Changes in allocated resources can be subject to subscriber agreements, which can be stored at or obtained by traffic analysis system 212.

In some aspects, changes in allocated resources can be based at least in part on changes in radio conditions observed by wireless client devices 204. In the event that poor radio conditions occur for a wireless client device 204, a guaranteed bit rate for the wireless client device 204 could request or require significantly more resources of network base station 202 than when such device observes better radio conditions. To achieve a balance between high client service and good support for application services, resources could be freed up by reducing resource allocation to client devices having little or no current demand, and increasing resources to those client devices with high current demand and experiencing poor radio conditions.

Although depicted as separate entities, traffic analysis system 212 could be co-located with content service 206, in one aspect of the subject disclosure. In another aspect, traffic analysis system 212 can be co-located with traffic analyzer 210. In yet another aspect, traffic analyzer 210 or traffic analysis system 212 can be co-located with network base station 202. Other arrangements are within the scope of the subject disclosure as well, for instance those which one of ordinary skill in the art might deduce from experience or extrapolate from the context provided by the subject disclosure.

In one or more embodiments of the subject disclosure, wireless communication system 200 can operate substantially according to the following process flow. A content application operating on a client device 204 can initiate an online service—for example an online video. Network base station 202 can request activation of the online service from content service 206. In response to the request for activation of the online service, content service 206 can request a level of resources (e.g., a bit rate, . . . ) for the online service from traffic analysis system 212. Additionally, content service 206 can forward a confirmation of initiation of the online service (e.g., playback of the online video) to client device 204 via network base station 202. Traffic analysis system 212 can determine a resource availability at client device 204. This determination can be made from information sent by client device 204, or content/traffic analysis performed by traffic analyzer 210, for instance. In the event that client device 204 observes sufficient resources to receive the content, content delivery can proceed as per agreements stored in accounting server 214.

Where client device observes less than sufficient resources (e.g., ½ of a target bit rate for playback of the online video), traffic analysis system 212 can perform one or more remedial functions. In one example, traffic analysis system 212 can activate traffic analyzer 210 to monitor current state of resource availability for network base station 202, and observed resources for the client device 204. Where observed resources for client device 204 drop below a target level, traffic analysis system 212 can request network base station 202 to modify resource allocation to client device 204 accordingly (e.g., initiate QoS, request video shaping, and so forth). Additional remedial operations for insufficient resource availability at client device 204 is described below with respect to FIG. 3, infra.

Figure 3:
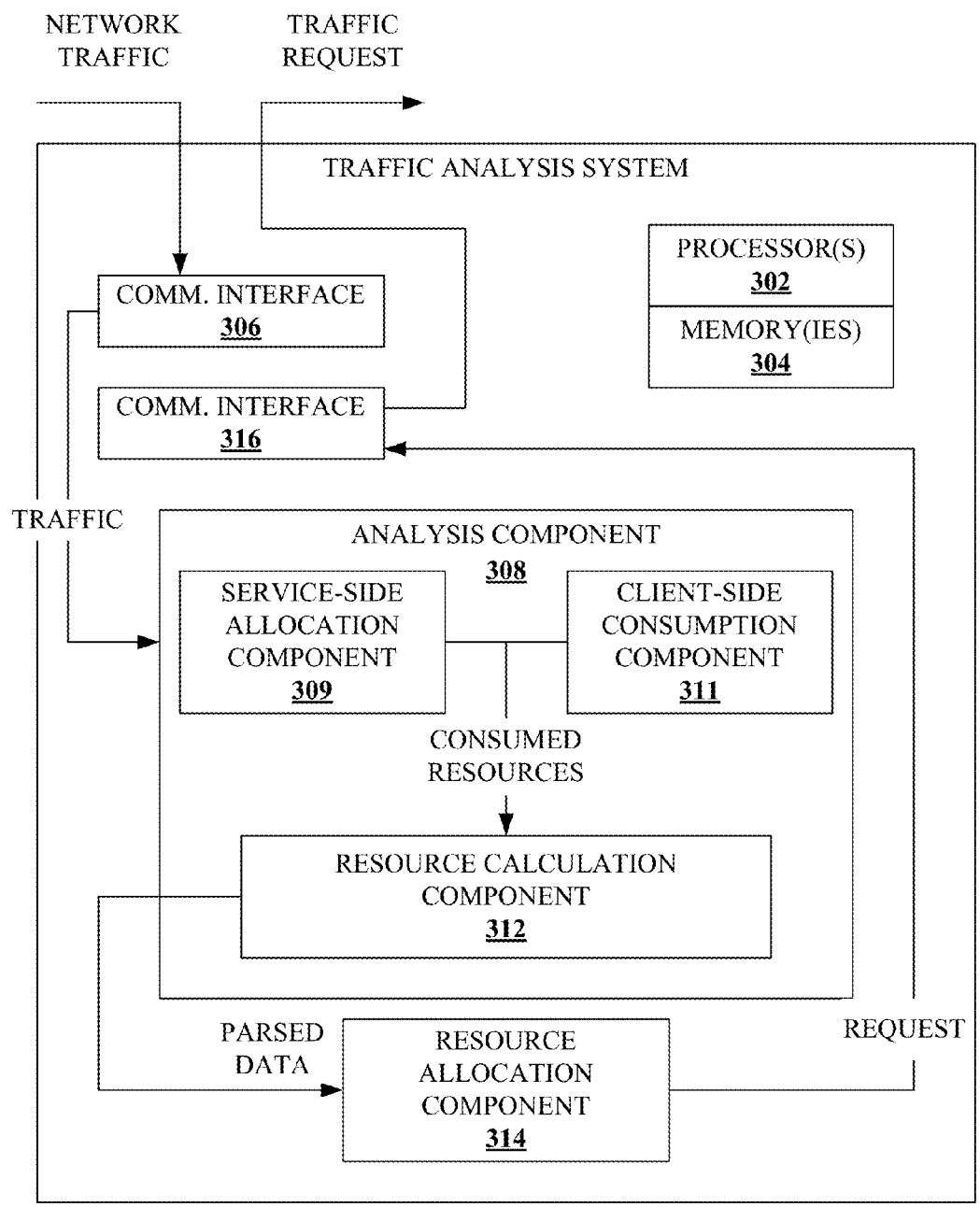
FIG. 3 depicts a block diagram of an example network access point comprising a traffic analysis system according to at least one aspect.

FIG. 3 illustrates a block diagram of an example traffic analysis system 300 according to one or more additional aspects of the subject disclosure. In an aspect(s), traffic analysis system 300 can be substantially similar to traffic analysis system 212 of FIG. 2, supra. In other aspects, traffic analysis system 300 can have a subset of features of traffic analysis system 212 in addition to other features described below. However, the subject disclosure is not so limited, as traffic analysis system 300 can have distinct features from those of traffic analysis system 212 in other disclosed aspects.

Traffic analysis system 300 can comprise a processor(s) 302 for executing instructions to implement features of traffic analysis system 300. Instructions can be stored in a memory(ies) 304 or in other components of traffic analysis system 300. As depicted, traffic analysis system 300 can additionally comprise a first communication interface 306 for receiving network traffic information pertaining to a client application or client device of the network. First communication interface 306 can be connected directly to a network component that handles traffic to the client application/device (e.g., a serving access point, a serving base station, a network router, a network switch, a traffic analyzer, an ISP traffic management component, . . . ), whereas in other aspects first communication interface 306 can receive a signal from a traffic mining component that includes the traffic information. In at least one disclosed aspect, first communication interface 306 can receive tariff, resource, or priority information, or the like, pertaining to a client device with respect to an online content or service. This information can be received in conjunction with the above network traffic data from an authentication server (e.g., authentication server 214, such as an authentication, authorization and accounting server, a home location register, or a suitable analogue in another network system, or the like).

Traffic information received by first communication interface 306 can be provided to an analysis component 308. Analysis component 308 can be configured to parse the traffic information as a function of one or more parameters. These parameters can include client device (e.g., to differentiate traffic among client devices), client application(s) (e.g., to differentiate traffic requested by or provided for an application), an amount of traffic such as a number of bits, time (e.g., to determine changes in the traffic, or time rate of change of one or more other parameters). In at least one aspect, the parameters can include an inferred playback state of an application consuming a subset of the traffic, where playback state could include inactive playback (e.g., no continuous traffic), active playback (e.g., an open traffic channel delivering application content), paused playback (e.g., an open traffic channel delivering little or no application content), or the like. In a related aspect, the playback state can be explicitly provided by the client application or client device, in addition to or in lieu of inferred playback state based on traffic conditions. Once parsing is completed, analysis component 308 can store parsed data in a data store (not depicted), and forward parsed data as a function of the one or more parameters to a resource consumption component 310.

Analysis component 308 can comprise a service-side allocation component 309 configured to monitor network-side resource availability or resource allocation, and a client-side consumption component 311 configured to derive or obtain resources observed at a client device, resources consumed by the client device, or resources consumed by respective applications of the client device. Thus, client-side consumption component 311 can be configured to determine a current amount of network resources consumed by a client device, or an amount(s) of resources consumed by a client application(s) operating on the client device. The determination can be determined at least in part from the parsed traffic data (e.g., parsed as a function of client device, parsed as a function of application(s) operating on respective client devices, and so on) provided by analysis component 308. Consumed resource information can be forwarded to a resource calculation component 312, which is configured to determine a level of access network resources (the level of access network resources can be defined qualitatively or quantitatively, or both) suitable to support the current amount of network resources. Alternatively, the resource calculation component 312 can reference a level of access network resources (again which can be defined qualitatively, quantitatively or both) applicable for a playback state of the client application.

Level of access network resources can be determined according to one or more methods. As one example, the determination of the level of access network resources can utilize a current bit rate of traffic, in conjunction with existing network conditions (e.g., radio conditions), network transfer rates (e.g., round-trip ping time), or the like, between a network access point and the client device. A bandwidth suitable for conveying the bit rate of traffic, given the existing network conditions can be established as the level of access network resources, optionally adjusted for a predetermined level of QoS. In additional aspects, the predetermined level of QoS can be derived from subscription agreement information. Resource calculation component 312 can attempt to request subscription agreement information from a source of traffic (e.g., a service provider), or from a network access point (e.g., base station, ISP equipment, . . . ). Alternatively, resource calculation component can query the client device for the subscription agreement information.

Further to the above, traffic analysis system 300 can comprise a resource allocation component 314. Resource allocation component 314 can be configured to facilitate modification of a level of network resources allocated to the application or to the client device. For example, where the current level of access network resources determined by service-side allocation component 309 does not match currently consumed resources determined by client-side consumption component 311, resource allocation component 312 can be configured to send a request for the allocated resources to be modified to match the currently consumed resources. Such a request can be transmitted via a second communication interface 316. In one aspect(s), the request can be transmitted to a network access point that services the client device/client application (e.g., wireless base station 202 of FIG. 2, supra), in which case second communication interface 316 and first communication interface 306 can be a single entity. In another aspect, the request can be transmitted to a service provider delivering application content to the client device/client application (e.g., content provider 206 of FIG. 2, supra), which can be forwarded by the service provider to the network access point in a network message, for instance. In this latter aspect, second communication interface 316 and first communication interface 306 can be separate communication interfaces, for instances where components of the service provider and components of the network access point are accessed over different networks or types of networks.

In one or more embodiments of the subject disclosure, analysis component 308 obtains tariff, billing or resource information for a client application that requests online content (requesting client application). From the tariff/billing/resource information, analysis component 308 can determine what service-side actions can be implemented to provide suitable resources to provide the online content to the requesting client application. The information can specify, for instance, whether additional resources can be allocated to the requesting client application (e.g., to make up a shortfall in resources observed at a client application versus resources involved in serving the online content), whether resources allocated to another client device or application can be diverted to a client device upon which the requesting client application is operating, whether resources consumed by additional client applications (e.g., as determined by client-side consumption component 311) can be diverted to the requesting client application, whether an offer can be sent to the client device to purchase additional network resources for playback of the online content, or the like, or a suitable combination thereof.

Where insufficient network resources exist to serve the requesting client application, analysis component 308 can be configured to identify a source of network overload (e.g., whether due to a client-side limitation or service-side limitation) and arbitrate a solution. For example, if a network access point is overloaded with client devices demanding network access, one solution can be to discriminate resources from another client (e.g., a lower priority client/application/subscription, etc.) in favor of the requesting client application (e.g., see network operation 400 of FIG. 4, infra). In another example, if a client device is running additional client applications in addition to the requesting client application, resources consumed by one or more of the additional client applications can be diverted to the requesting client application. In an alternative embodiment of the subject disclosure, analysis component 308 can be configured to identify whether a tariff or subscription plan is insufficient to support requested online content, identify a suitable tariff or subscription plan, and transmit an offer to the requesting client application to purchase or upgrade to the suitable tariff or subscription plan.

Figure 4:
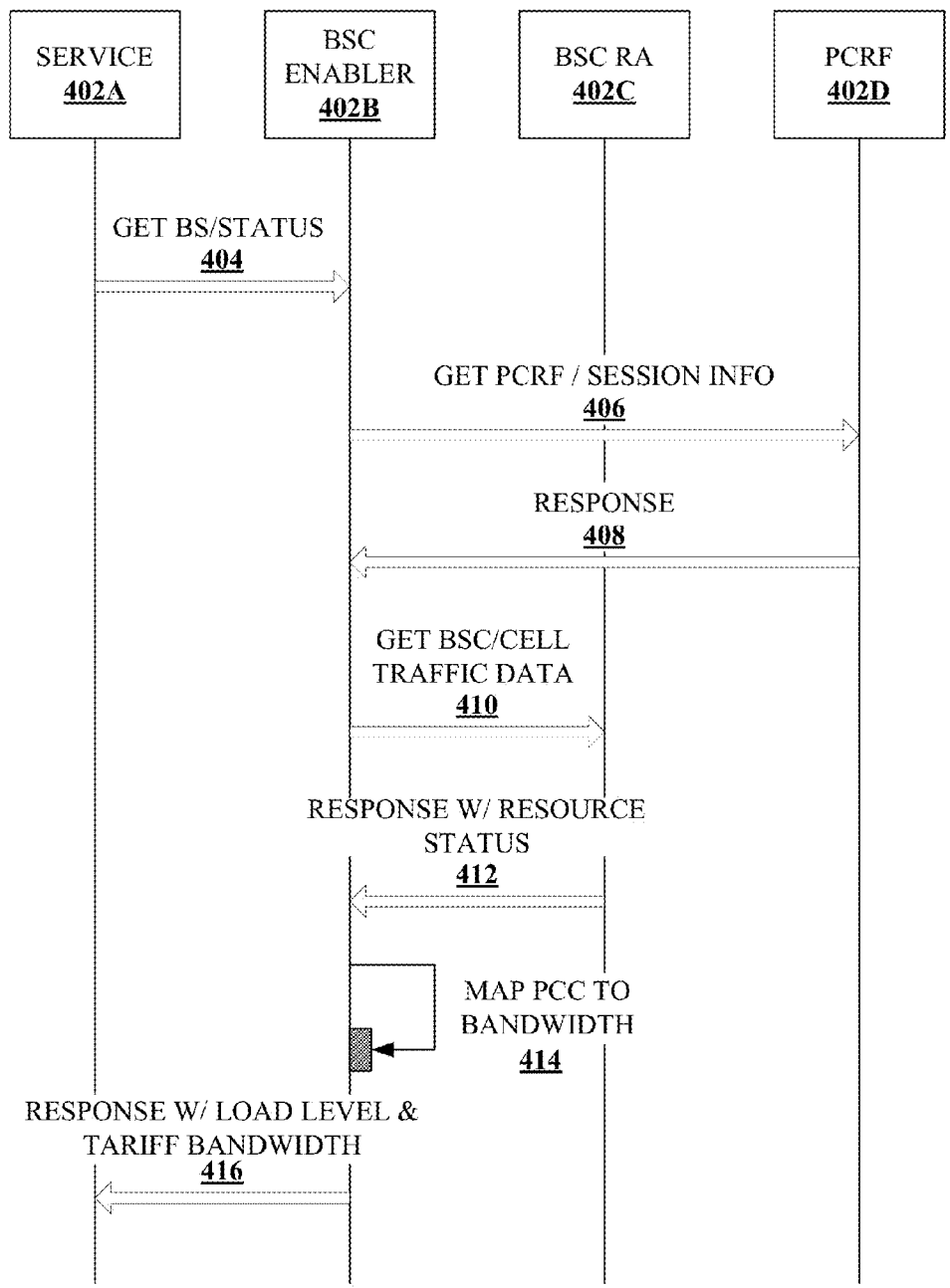
FIG. 4 illustrates a block diagram of a sample network communication for obtaining client device status information for resource management, in some aspects.

FIG. 4 depicts a diagram of an example network operation 400 related to acquiring client conditions of a network client, according to various disclosed aspects. Network operation 400 involves interaction between a service provider 402A, a base station control (BSC) enabler 402B, a BSC routing area (RA) 402C and a policy and charging rule function (PCRF) 402D. Service provider 402A can be a server facilitating network communication services (e.g., phone calling, video-phone calling, conference calling, etc.), network media services (e.g., streaming audio, streaming video, streaming audio/video, and so on), or browsing and download services (e.g., web browsing, FTP download, and so forth), or the like, or a suitable combination thereof. BSC enabler 402B, BSC RA 402C and PCRF 402D can be components of a mobile communication network as defined by mobile communication network standards publications published by associated standard-setting bodies (e.g., third generation partnership project [3GPP], third generation partnership project two [3GPP2], and related bodies).

At 404, service provider 402A can submit a request to get base station or access point status information, to BSC enabler 402B. At 406, BSC enabler 402B sends a get PCRF session information request to PCRF 402D. PCRF 402D can respond at 408 with a negative acknowledgement (NACK) if an error is found related to the PCRF session information request. Otherwise, PCRF 402D can respond at 408 with an acknowledgment (ACK) including the requested session information.

At 410, BSC enabler 402B can send a command requesting traffic data of a base station or cell to BSC RA 402C. BSC RA 402C can respond at 412 with the traffic data, or send an error if a problem related to the command requesting traffic data is identified. At 414, BSC enabler 402B can loop a mapping policy and charging control (PCC) to map costs of consumed traffic for client devices of a cell or group of cells. BSC enabler 402B can respond with cell loading level and tariff information for allocated bandwidth for a requested client device or set of client devices. The loading level and tariff information can be utilized, at least in part, for determining current resource allocation information for client applications or client devices of the mobile network, and for determining suitable modifications to resource allocations based on current traffic demand and tariff information.

Figure 5:
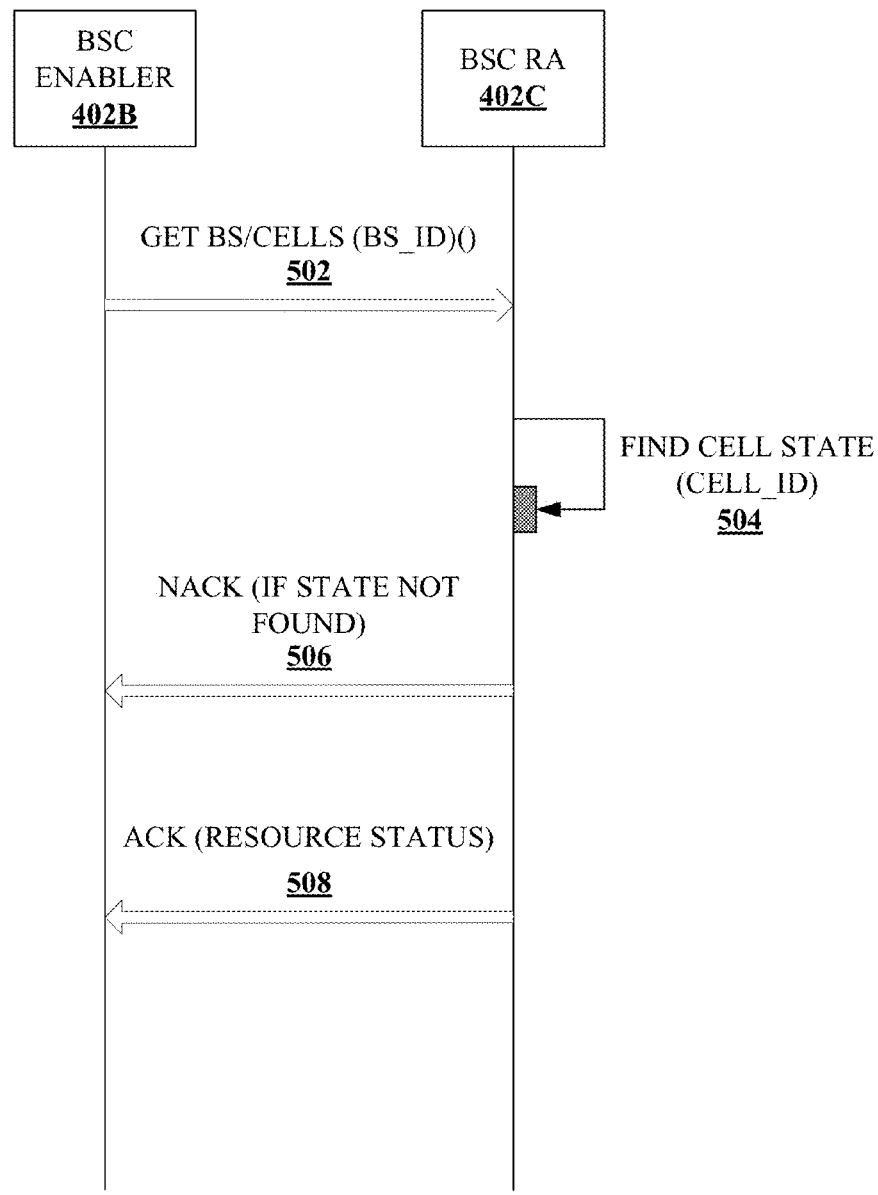
FIG. 5 illustrates a block diagram of an example network communication for acquiring status of a base station or cell, in additional aspects.

FIG. 5 illustrates a diagram of an example network operation 500 for acquiring resource status information for one or more cells of a mobile network, according to further disclosed aspects. Network operation 500 incorporates interactions between BSC enabler 402B and BSC RA 402C introduced in network operation 400 of FIG. 4, supra. At 502, BSC enabler 402B sends a request to get base station or cell information. The request can include an identifier(s) for the base station(s) or cell(s), BS_ID. BSC RA 402C can initiate an operation loop and acquire respective resource states of cells associated with the base station identifier(s) at 504. At 506, BSC RA 402C transmits a NACK if a state is not found for a cell or base station associated with the identifier(s). Otherwise, an ACK is returned at 508 including resource status information for clients of the base station/cells associated with the identifier(s).

Figure 6:
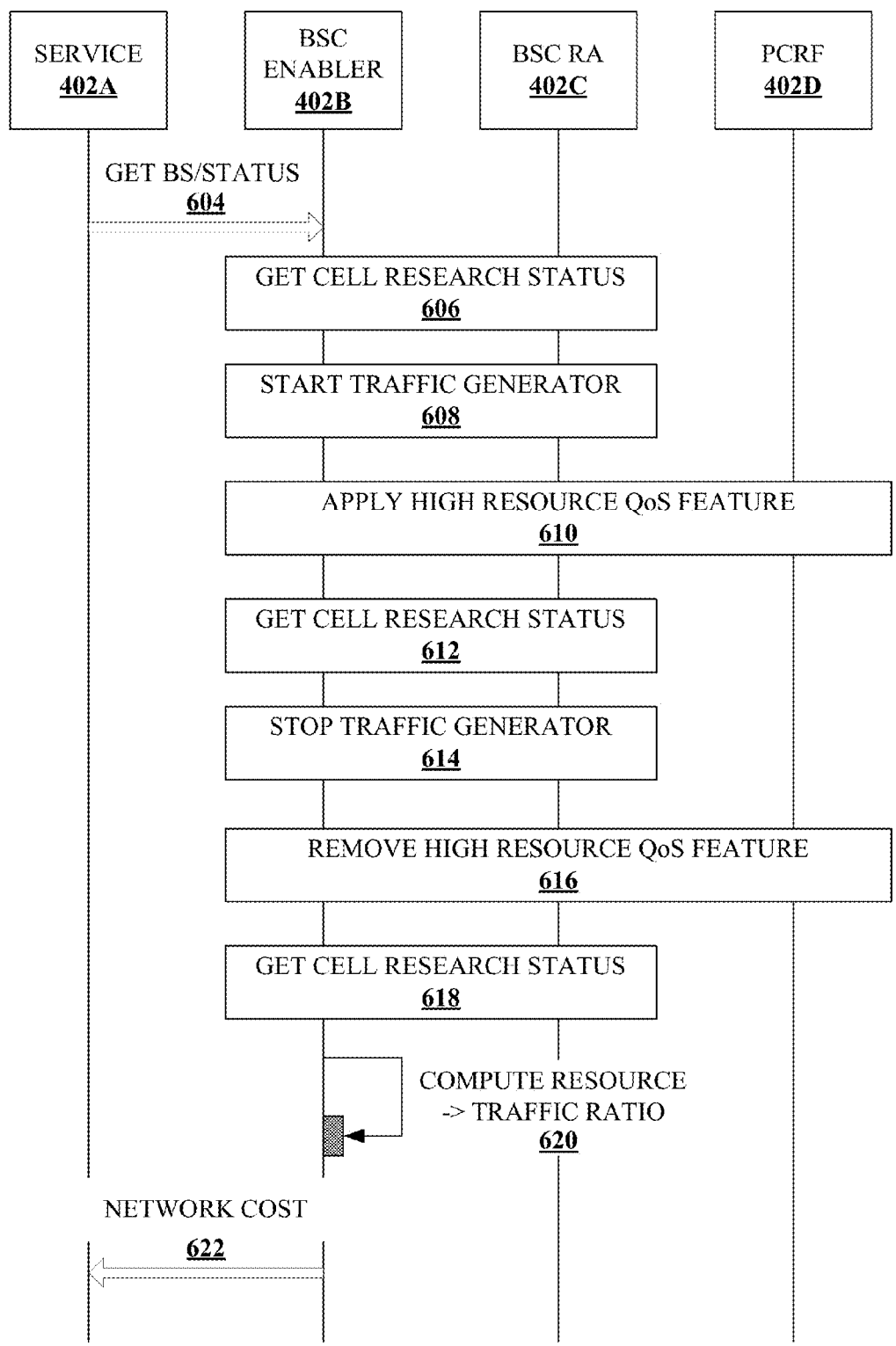
FIG. 6 depicts a block diagram of a sample network communication to apply network resources as a function of base station or client status in other aspects.

FIG. 6 illustrates a diagram of an example network operation 600 according to one or more additional aspects of the subject disclosure. Network operation 600 includes interactions between service provider 402A, BSC enabler 402B, BSC RA 402C and PCRF 402D introduced at network operation 400 of FIG. 4, supra. At 602, service provider 402A transmits a request for base station status information. At 606, BSC enabler 402B initiates a get cell research status operation with BSC RA 402C, and at 608 a start traffic generator operation is conducted between BSC enabler 402B and BSC RA, tracking traffic consumption of one or more client devices or client applications served by BSC RA 402C. At 608, BSC enabler 402B initiates a high resource QoS feature 610 for traffic consumption of the one or more client devices or client applications. This high resource QoS feature can be in response to initiation of a network application having high quality or high bandwidth requests or requirements. Following application of the high resource QoS feature, BSC enabler 402B at 612 can again issue the get cell research status operation 612. The traffic generator can be stopped at 614, and the high resource QoS feature can be removed at 616. A get cell research status operation 616 is again initiated by BSC enabler 402B. BSC enabler 402B enters an operation loop and computes a resource to traffic ratio 620 for a set of client devices/applications operating within a cell or cells. At 622, BSC enabler 402B forwards a cost metric associated with the resource to traffic ratio calculations 620 to service provider 402A.

The aforementioned diagrams have been described with respect to interaction between several systems, apparatuses, components, user interfaces, networks, network interfaces, or the like. It should be appreciated that such diagrams can include those components or systems specified therein, some of the specified components, or additional components. For example, system 100 could include population of client devices 106, service provider 402A, BSC enabler 402B and traffic analysis system 300, as one possible example. Sub-components could also be implemented as components electrically connected to other sub-components rather than included within a parent component. Additionally, it should be noted that two or more components could be combined into a single component providing aggregate functionality. For instance, resource consumption component 220 can include resource calculation component 212 to facilitate tracking a current level of network traffic versus currently allocated network resources, by way of a single component. Components of the disclosed systems and apparatuses can also interact with one or more other components not specifically described herein but known by those of skill in the art, or made known to one of skill in the art by way of the context provided herein.

Figure 7:
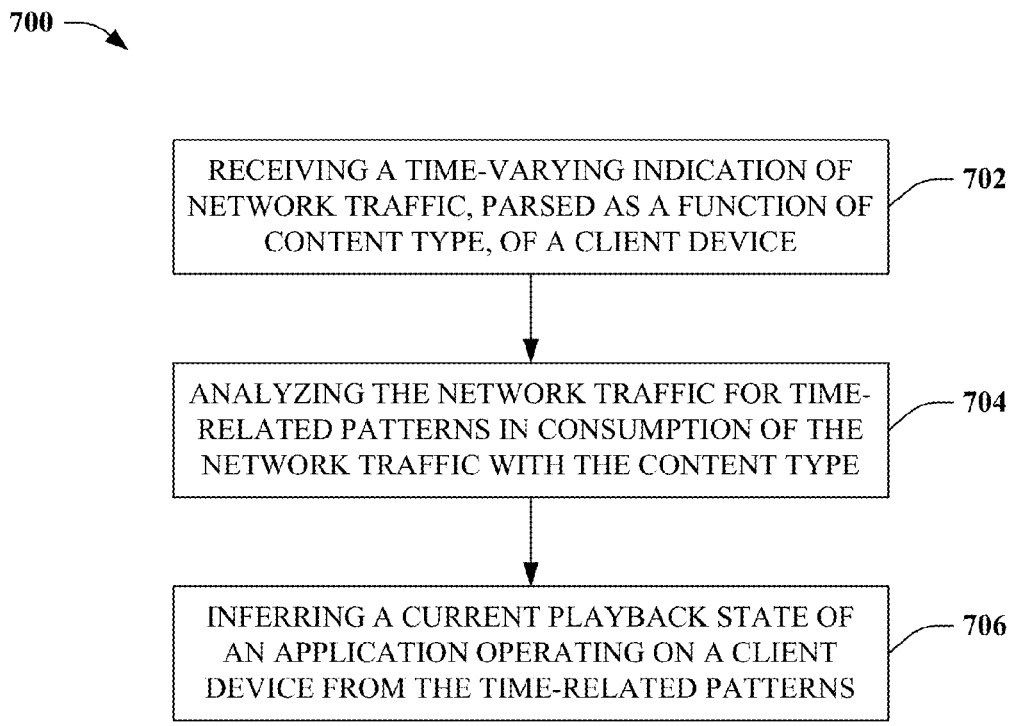
FIG. 7 illustrates a flowchart of a sample method for determining a playback state of a client device in a network communication.
Figure 8:
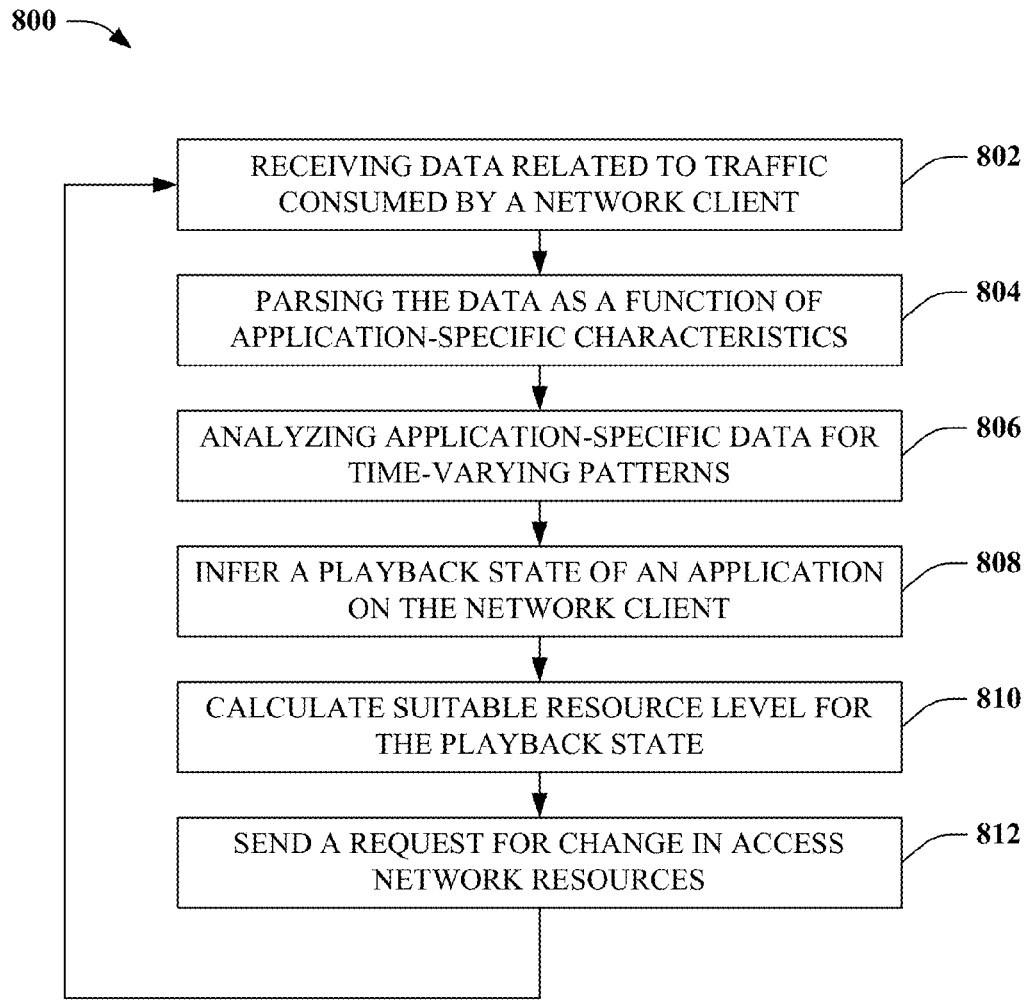
FIG. 8 depicts a flowchart of an example method for distributing network resources based on playback state of a client device in aspects.

In view of the exemplary diagrams described supra, process methods that may be implemented in accordance with the disclosed subject matter will be better appreciated with reference to the flow chart of FIGS. 7-8. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Additionally, it should be further appreciated that the methods disclosed hereinafter and throughout this specification are capable of being stored on an article of manufacture to facilitate transporting and transferring such methods to an electronic device. The term article of manufacture, as used, is intended to encompass a computer program accessible from any computer-readable device, device in conjunction with a carrier, or storage medium.

FIG. 7 illustrates a flowchart of an example method for tracking real-time network resource consumption of a client application, according to one or more disclosed aspects. At 702, method 700 can comprise receiving a time-varying indication of network traffic particular to a client device of a network. In some aspects, the time-varying indication of network traffic can be parsed according to one or more parameters. The one or more parameters can include a type of content, in at least one aspect. Type of content can include text content, media content, streaming media content, web browsing content, real-time audio communication content, real-time audio/video communication content, or the like. In at least one disclosed aspect, a category of application can be inferred from the type of content of network traffic.

At 704, method 700 can comprise analyzing the network traffic particular to the client device for time-related patterns in consumption of the network traffic having the content type. The time-related patterns can identify initiation of content-specific traffic, termination of content-specific traffic, or the like. In addition, the time-related patterns can identify significant changes in the content-specific traffic.

At 706, method 700 can comprise inferring a current playback state of an application operating on a client device at least in part from the time-related patterns. The inference can be drawn from a model or a set of models pertaining to applications of the content type. For example, changes in the content-specific traffic can be applied to the model or set of models to identify a suitable playback state for the application. Examples of playback state can include, but are not limited to, playback of content, paused playback of content, fast forward or rewind of content, and so on. In at least one aspect of the subject disclosure, the current playback state can be monitored over time to identify changes in the current playback state. A monitoring frequency can be comparable with user usage rates of the application (e.g., several seconds or less), resulting in identification of changes in the current playback state that is similar to the rate at which a user interacts with the application to change the current playback state.

FIG. 8 illustrates a flowchart of an example method 800 for determining adequate network resource allocation based on contemporaneous client traffic demand, in additional aspects. At 802, method 800 can comprise receiving data related to contemporaneous traffic consumed by a network client. At 804, method 800 can comprise parsing the data as a function of one or more characteristics. For example, the one or more characteristics can include a characteristic indicative of an application or category of application (e.g., communication, media playback, navigation, . . . ) operating at the network client. At 806, method 800 can comprise analyzing application-specific data for time-varying patterns in the contemporaneous traffic. At 808, method 800 can comprise inferring a playback state of an application on the network client. At 810, method 800 can comprise calculating a suitable level of network resources (e.g., defined qualitatively, quantitatively, or a combination thereof) for the playback state. At 812, method 800 can comprise sending a request for change in access network resources consistent with the suitable level of network resources.

Figure 9:
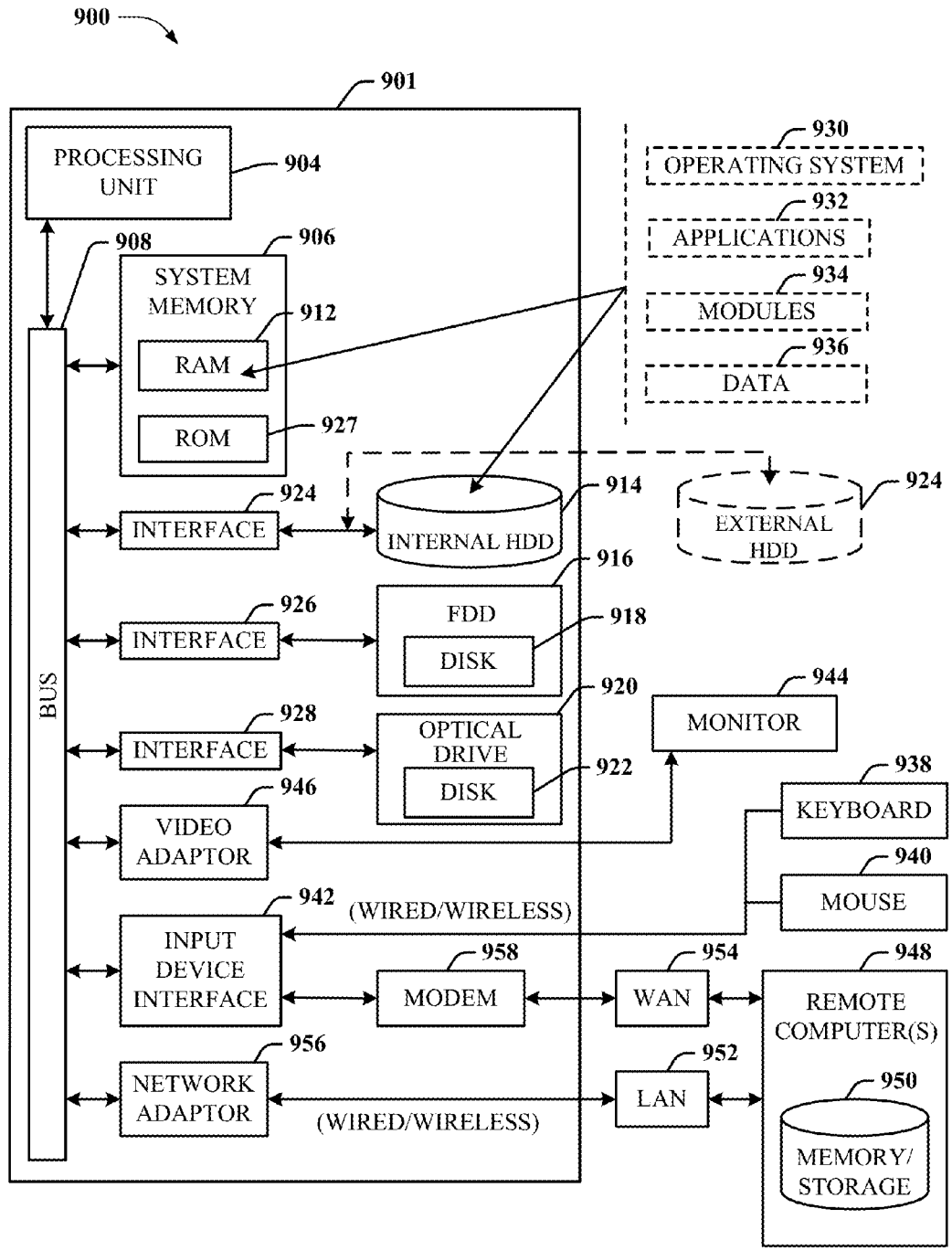
FIG. 9 illustrates a block diagram of an example electronic computing environment that can be implemented in conjunction with one or more aspects.

With reference to FIG. 9, an exemplary environment 900 for implementing various aspects described herein includes a computer 902, the computer 902 including a processing unit 904, a system memory 906 and a system bus 908. The system bus 908 connects system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that aspects of the subject disclosure can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 can operate in a networked environment using logical connections by wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or can be connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi® and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), or other bands (e.g., 802.11g, 802.11n, . . . ) so the networks can provide real-world performance similar to the basic 10BaseT wired Ethernet networks used in many offices.

Figure 10:
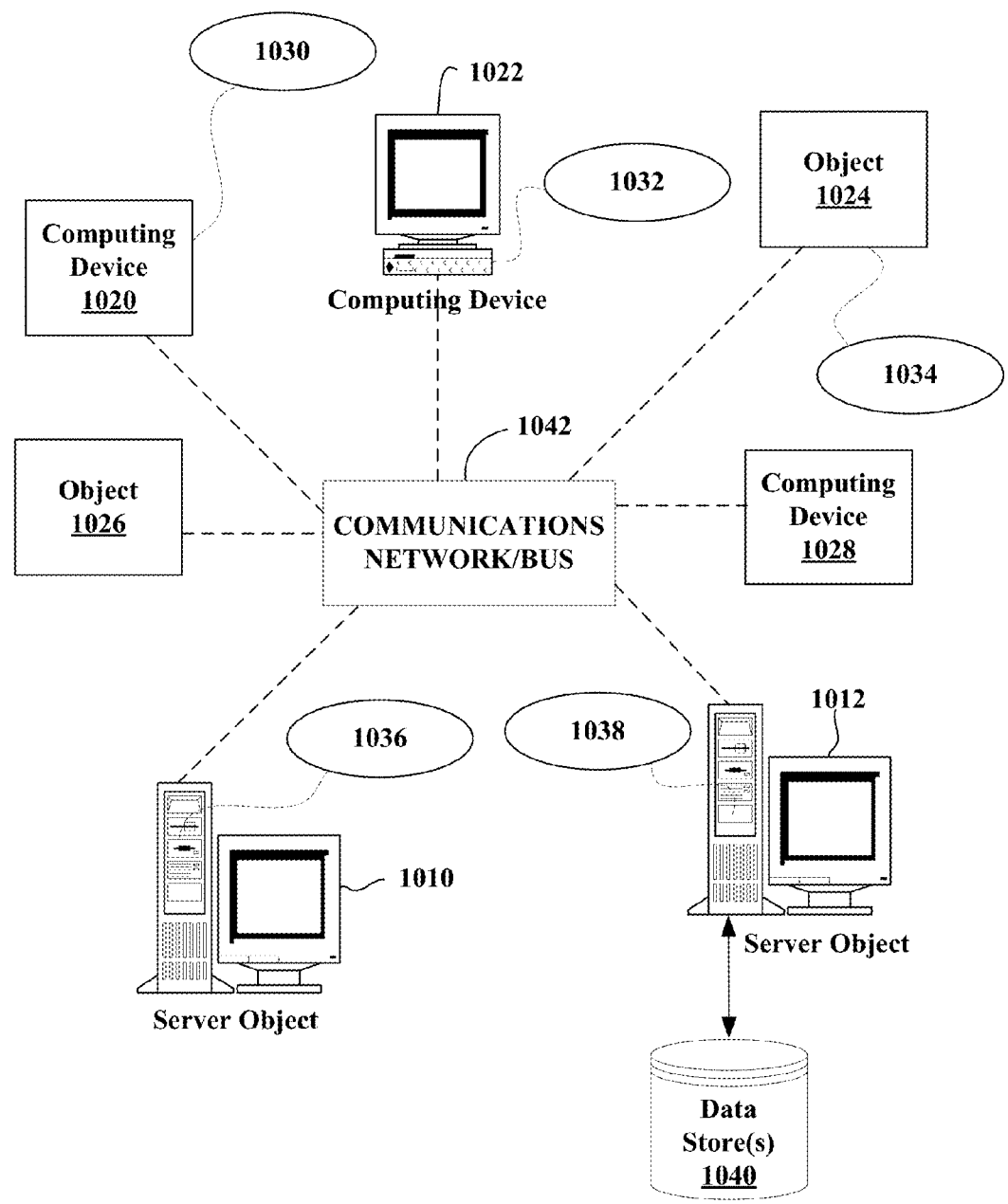
FIG. 10 depicts a block diagram of an example data communication network that can be operable in conjunction with various aspects described herein.

FIG. 10 provides a schematic diagram of an exemplary networked or distributed computing environment. The distributed computing environment comprises server objects 1010, 1012, etc. and computing devices or objects 1020, 1022, 1024, 1026, 1028, etc., which may include programs, methods, data stores, programmable logic, etc., as represented by applications 1030, 1032, 1034, 1036, 1038 and data store(s) 1040. It can be appreciated that server objects 1010, 1012, etc. and computing devices or objects 1020, 1022, 1024, 1026, 1028, etc. may comprise different devices, including content service 206, traffic analysis component 108, traffic analysis system 212, traffic analysis system 300, population of client devices 106, or similar entities depicted within the illustrations, or other devices such as a network-enabled display device, network-enabled television, set-top box with network connection and display, satellite receiver and display, mobile phone, personal digital assistant (PDA), audio/video device, MP3 players, personal computer, laptop, etc. It should be further appreciated that data store(s) 1040 can include data store 120, or another similar data store.

Each server object 1010, 1012, etc. and computing devices or objects 1020, 1022, 1024, 1026, 1028, etc. can communicate with one or more other server objects 1010, 1012, etc. and computing devices or objects 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, or may represent multiple interconnected networks, which are not shown. Each server object 1010, 1012, etc. or computing device or object 1020, 1022, 1024, 1026, 1028, etc. can also contain an application, such as applications 1030, 1032, 1034, 1036, 1038, that might make use of an API, or other object, software, firmware or hardware, suitable for communication with or implementation of the techniques for search augmented menu and configuration functions provided in accordance with various embodiments of the subject disclosure.

There is a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. One or more of these network topologies can be employed by population of client devices 106, or network access point(s) 104, content service 206, data network 208, network base station 202, and others, for communicating with a network. The "client" is a member of a class or group that uses the services of another class or group to which it is not related. A client can be a process, e.g., roughly a set of instructions or tasks, that requests a service provided by another program or process. The client process utilizes the requested service, in some cases without having to "know" any working details about the other program or the service itself. A client device can be a computing device or object 1020, 1022, 1024, 1026, 1028 upon which a client process operates or is executed, in one or more disclosed aspects.

In a client/server architecture, such as a networked system, a client is usually a computer that accesses shared network resources provided by another computer, e.g., a server. In the illustration of FIG. 10, as a non-limiting example, computing devices or objects 1020, 1022, 1024, 1026, 1028, etc. can be thought of as clients and server objects 1010, 1012, etc. can be thought of as servers where server objects 1010, 1012, etc., acting as servers provide data services, such as receiving data from client computing devices or objects 1020, 1022, 1024, 1026, 1028, etc., storing of data, processing of data, transmitting data to client computing devices or objects 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the server objects 1010, 1012, etc. can be Web servers with which other computing devices or objects 1020, 1022, 1024, 1026, 1028, etc. communicate via any of a number of known protocols, such as the hypertext transfer protocol (HTTP). Server objects 1010, 1012, etc. acting as servers may also serve as clients, e.g., computing devices or objects 1020, 1022, 1024, 1026, 1028, etc., as may be characteristic of a distributed computing environment.

The subject matter described herein can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" where used herein means serving as an example, instance, or illustration. For the avoidance of doubt, the subject matter disclosed herein is not limited by such examples. In addition, any aspect, embodiment or design described herein as "exemplary", "demonstrative", "illustrative", or the like, is not necessarily to be construed as preferred or advantageous over other aspects or designs, nor is it meant to preclude equivalent exemplary structures and techniques known to those of ordinary skill in the art.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising: a processor, coupled to a memory, configured to execute or facilitate execution of computer-executable components, comprising:
    a first communication interface configured to send a signal to or receive another signal from a network access device, wherein the network access device provides client access network resources to a client device and facilitates a data link between a content server device of a communication network and a client device of the network access device;
    an analysis component configured to monitor the data link and measure a dynamic bit rate at Which content traffic of a content type particular to a media application is transmitted through the data link from the content server device to the client device, wherein the system is external to the data link, and to infer a playback state of the media application operating at the client device based on the measured dynamic bit rate at which the content traffic is transmitted through the data link and generating an inferred playback state that matches a level of the client access network resources different from a current level of the client access network resources allocated to the data link for the client device by the network access device; and
    a second communication interface configured to transmit a report signal to a server device of a service network or to the network access device, wherein the report signal represents data pertaining to a request to qualitatively or quantitatively adjust the client access network resources from the current level of the client access network resources to the level of the client access network resources in response to the inferred playback state.

2. The system of claim 1, wherein the computer-executable components further comprise a traffic monitoring component configured to access traffic for the client device and measure the dynamic hit rate at which content traffic is transmitted through the data link at a frequency of several seconds in duration.

3. The system of claim 1, wherein the network access device is a wireless access network base station device or access point device of at least one of: a wireless area network device, a mobile network device or a cellular network device.

4. The system of claim 1, wherein the analysis component is further configured to infer a user control state of the media application.

5. The system of claim 4, wherein the user control state includes at least one of: a currently displayed state, a minimized non-displayed state, a user activity state or a user inactivity state.

6. The system of claim 1, wherein the analysis component is configured to parse packet information transmitted by the content server device to the client device as a function of the content traffic, and analyze the content traffic of the parsed packets over time to measure the dynamic bit rate at which the content traffic is transmitted through the data link.

7. The system of claim 1, wherein the computer-executable components further comprise a resource consumption component configured to determine the current level of the client access network resources consumed by the media application operating on the client device.

8. The system of claim 7, wherein analysis component is further configured to derive current application specific network traffic information from the content traffic on the data link, and the resource consumption component is further configured to determine the current level of the client access network resources at least in part from the current application-specific network traffic information.

9. The system of claim 8, wherein the computer-executable components further comprise a resource calculation component configured to determine the level of the client access network resources different from the current level of the client access network resources that matches the inferred playback state of the media application.

10. The system of claim 9, wherein the computer-executable components further comprise a resource allocation component configured to generate the request to qualitatively or quantitatively adjust the client access network resources and transmit the request to the network access device to modify the client access network resources provided by the network access device to the client device to the level of the client access network resources determined by the resource calculation component.

11. The system of claim 10, wherein:
the analysis component is further configured to monitor changes in the current application-specific network traffic information at a determined frequency, and to identify a change in application-specific resource consumption of the client device, the resource consumption component is further configured to determine a corresponding change in the amount of client access network resources to support the change in application-specific resource consumption, and the resource allocation component is further configured to request the network access device to modify resources allocated to the client device or to the media application according to the corresponding change in the amount of client access network resources.

12. A method, comprising:
monitoring by a system comprising a processor, a data link between a content server and a client device;
parsing data transmitted between the content server and the client device via the data link as a function of content type, particular to the client device, and identifying media content, particular to the client device, as a subset of the data transmitted between the content server and the client device via the data link;
measuring a dynamic rate at which the media content, particular to the client device, is transmitted between the content server and the client device via the data link and generating a measured dynamic hit rate, wherein the system is external to the data link; analyzing the measured dynamic bit rate at which the media content, particular to the client device, is transmitted within the data :link for a time-related pattern in consumption of the media content having the content type;
inferring a current playback state of an application operating on the client device from the time-related pattern resulting in an inferred playback state, the inferred playback state satisfying a criterion for modifying access point network resources supporting the data link;
identifying a change in access point network resources of a network access point device serving the client device that matches the inferred playback state of the application; and
transmitting a signal comprising data representing a request for the change in access point network resources that matches the inferred playback state of the application.

13. The method of claim 12, further comprising determining a level of the access point network resources matching at least the current playback state of the application.

14. The method of claim 13, further comprising determining the change in access point network resources from a current level of the access point network resources and the level of the access point network resources.

15. The method of claim 14, wherein transmitting the signal further comprises transmitting the signal over an application programming interface to the network access point device serving the client device.

16. The method of claim 14, wherein transmitting the signal further comprises transmitting the level of network resources within the signal to a service network device coupled to the data link and providing the media content to the client device.

17. The method of claim 12, wherein the analyzing the measured dynamic hit rate at which the media content, particular to the client device, is transmitted further comprises analyzing the measured dynamic bit rate with a. time resolution comparable to a rate of user activity on the application.

18. The method of claim 17, wherein the analyzing the measured dynamic hit rate at which the media content, particular to the client device, is transmitted further comprises retrieving, from a storage device comprising a model of user activity, rate information pertinent to at least one of: the media content having the content type, a make or model of the client device, data processing capabilities of the client device, or data processing capabilities of the application.

19. The method of claim 12, wherein the analyzing the measured dynamic hit rate at which the media content, particular to the client device, is transmitted further comprises analyzing the time-related pattern with a time resolution of several seconds in duration.

20. The method of claim 12, further comprising obtaining from a service provider server device associated with the client device or with the network access point device agreement data representing a policy agreement affecting the client device.

21. The method of claim 20, further comprising determining a level of the network access resources suitable to the playback state of the application.

22. The method of claim 21, further comprising comparing the level of the network access resources to the policy agreement and determining whether the change in network access resources is consistent with the policy agreement.

23. The method of claim 22, further comprising compiling the data with information indicative of a qualitative or quantitative change in the network access resources consistent with the policy agreement and the playback state of the application.

24. The method of claim 23, further comprising compiling the data with a request to reduce the network access resources or a level of QoS to the client device in response to determining the playback state of the application is a paused or inactive state and determining the reduced network access resources or the level of QoS is consistent with the policy agreement, wherein the network access point device is a cellular base station configured to dynamically allocate and reallocate bandwidth to a population of client devices including the client device, and wherein the request to reduce the network access resources or the level of OoS facilitates an increase of network access resources or level of OoS to a second client device of the population of client devices.

25. The method of claim 23, further comprising compiling the data with a request to increase the network access resources or a level of QoS to the client device in response to determining the playback state of the application is an active state and determining the increased network access resources or the level of QoS is consistent with the policy agreement, wherein the network access point device is a cellular base station configured to dynamically allocate and reallocate bandwidth to a population of client devices including the client device, and wherein the request to increase the network access resources or the level of QoS facilitates a decrease of network access resources or level of QoS to a second client device of the population of client devices.

26. The system of claim 1, wherein the computer-executable components further comprise an accounting server that stores client agreement data representing terms of a service agreement affecting the client access network resources provided by the network access device for the client device.

27. The system of claim 26, wherein the analysis component is further configured to determine whether the request to qualitatively or quantitatively adjust the client access network resources is consistent with the terms of the service agreement represented within the client agreement data.

28. The system of claim 26, wherein the analysis component is further configured to forward the request to qualitatively or quantitatively adjust the client access network resources to the accounting server to determine compatibility between the terms of the service agreement and the request to qualitatively or quantitatively adjust the client access network resources.

29. The system of claim 28, wherein the accounting server replies with an approval of the request in response to the request being compatible with the terms of the service agreement, and responds with adjustment data indicative of a tariff, fee or change in billing information applicable to the client device in response to the request to qualitatively or quantitatively adjust the client access network resources from the current level to the level of the client access network resources.

* * * * *